L. G. BINKLEY.
MINE CAR WHEEL.
APPLICATION FILED NOV. 23, 1918.
1,329,497.
Patented Feb. 3, 1920.
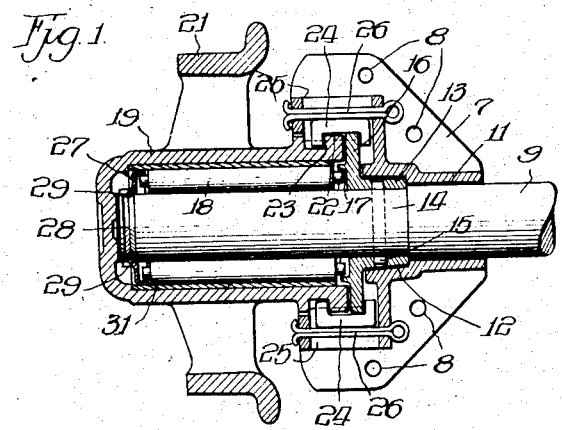
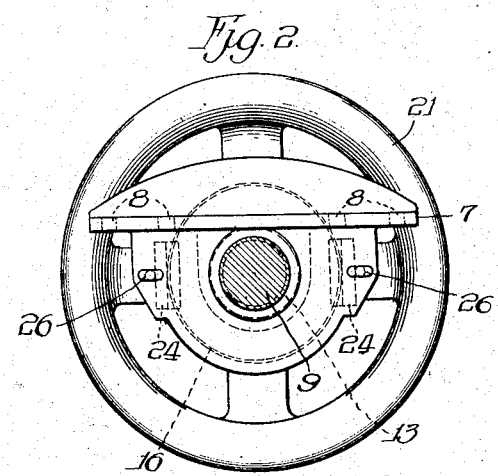
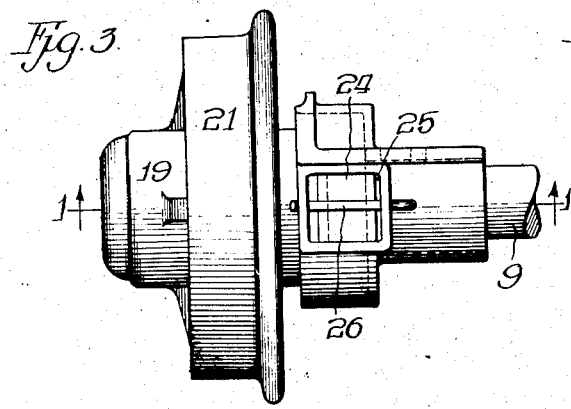
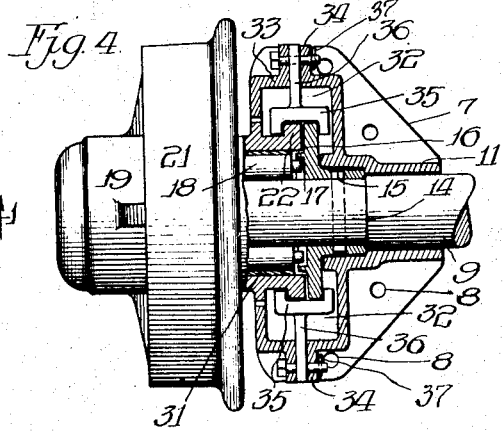
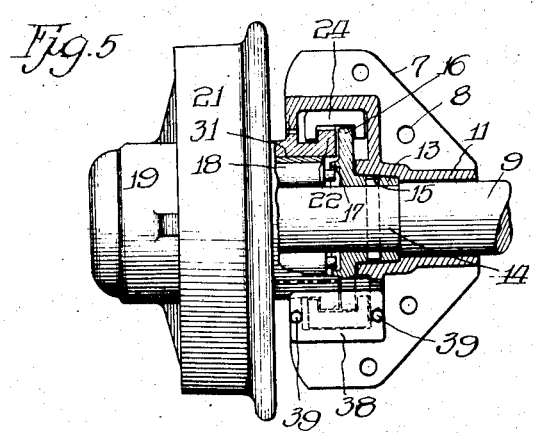
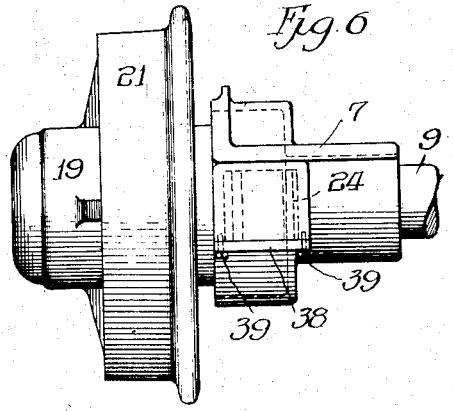
Witness
A. Burkhardt
Inventor:
Leroy G. Binkley
By Ponde Wilson
Attys

UNITED STATES PATENT OFFICE.

LEROY G. BINKLEY, OF CHICAGO, ILLINOIS, ASSIGNOR TO RAILWAY & MINE SUPPLY COMPANY, OF CHICAGO, ILLINOIS, A CORPORATION OF ILLINOIS.

MINE-CAR WHEEL.

1,329,497.  Specification of Letters Patent.  Patented Feb. 3, 1920.

Application filed November 23, 1918. Serial No. 263,827.

*To all whom it may concern:*

Be it known that I, LEROY G. BINKLEY, a citizen of the United States, residing at Chicago, in the county of Cook and State of Illinois, have invented certain new and useful Improvements in Mine-Car Wheels, of which the following is a specification.

This invention pertains to car wheels and has more particular reference to wheel structures adapted for use on mine cars which are subjected to extremely rough usage and are obliged to travel over rough and irregular tracks.

The present approved practice in mine car construction is to have rotatable axles with the wheels also rotatable upon the axles so that the axles may revolve or the wheels may revolve independently of the rotation of the axles. Since derailment of the cars occurs not infrequently as the result of hasty track construction and the sharp curves which are present in all mine tracks, it is necessary to make provision for taking care of the inwardly directed end thrust of the wheels and also to lock the wheels against accidental displacement off the end of the axle. Various structures have been proposed to accomplish these purposes and the present invention has for its primary object the provision of a structure in which these results will be satisfactorily and economically secured.

Instead of having the end thrust of the wheels transmitted directly to the bearing boxes, as has been heretofore done, and instead of locking the wheels to the boxes or to the ends of the axle against longitudinal displacement from the axle, as has also been customary heretofore, I have provided a construction in which the inwardly directed end thrust is transmitted from the inner end of the wheel hub to the axle itself and I have also provided locking means which locks the inner end of the wheel hub to the axle so that it is thereby held against longitudinal displacement.

Another feature of my invention resides in the provision of strong and simple locking means whereby the wheel is locked to the axle, which means can be readily placed in and removed from operative position so as to lock and release the wheel whenever it becomes necessary to do so.

The roller bearing wheel, because of the lightness of draft resulting from its use, is becoming very popular. Some of these wheels have the roller bearings mounted within the hub itself, so that when the wheel is removed from the axle the rollers remain in the hub. This construction, however, has disadvantages in that the rollers are not accessible for repairs or replacement. Others have the rollers mounted in cages on the axle but these cages soon wear out. Still others dispose the rollers loosely between the axle and wheel hub but upon removal of the wheel the rollers fall out upon the ground.

Another object of my present invention is to overcome the objectionable features above mentioned and this result is accomplished by the provision of novel means for retaining the rollers in position on the axle instead of in the wheel hub and without the employment of objectionable cages, so that when the wheel is removed the rollers remain in position on the axle, where they may be readily inspected and repaired or replaced.

Various other objects and inherent advantages of my invention will be readily appreciated as the same is better understood by reference to the following description when considered in connection with the accompanying drawings.

Referring to the drawings—

Figure 1 is a longitudinal sectional view of a car wheel mounting embodying my invention;

Fig. 2 is an end elevation looking toward the left at the construction shown in Fig. 1;

Fig. 3 is a side elevation of the construction shown in Figs. 1 and 2;

Fig. 4 is a view similar to Fig. 1 showing another form of my invention;

Fig. 5 is a similar view showing still another embodiment of my invention; and

Fig. 6 is a side elevation of the structure shown in Fig. 5.

Referring to the drawings and particularly Figs. 1 and 3 thereof, reference character 7 indicates generally a bearing box for a mine car which is adapted to be securely attached to the body of the car by bolts which pass upwardly through the openings 8 provided in the web of the box for that purpose. Within the box there is journaled the axle 9 which extends from side to side of the car and of course projects at its opposite end through a box similar to that shown in the drawings. It is thought, however, that an illustration of a box and wheel at one side of the car will be sufficient for an understanding of my invention. The core or bearing portion 11 of the box through which the axle 9 projects is slightly enlarged toward the center of the box, as indicated by reference character 12, to receive a collar 13 which may be rotatably mounted on the axle and held against longitudinal movement or rigidly attached to a reduced portion 14 of the axle by means of a pin 15, or other preferred fastening means. This collar is provided at its inner end with a radially projecting flange 16 forming in effect a shoulder on the axle and this flange projects outwardly into the body of the bearing box and is provided on its inner face with an annular rib 17 which serves to hold against displacement the inner ends of the bearing rollers 18 which are interposed between the axle and the surrounding hub 19 of the car wheel 21.

The inner end of the hub of the wheel 21 is also provided with a circumferential flange 22 adapted to abut against the flange 16 so that inward end thrust of the wheel is transmitted through the flange 16 directly to the axle 9. This wheel flange also provides a shoulder 23 and for the purpose of locking the wheel to the axle against longitudinal displacement therefrom I have provided a plurality of channel-shaped retainers 24 adapted, as shown in Fig. 1, to embrace the flanges or shoulders on the wheel hub and the axle so that the wheel is securely locked against outward movement with respect to the axle. To accommodate these retainers 24 the sides of the bearing box are provided with laterally opening pockets 25, as shown in Figs. 1 and 3 and after the wheel has been positioned on the axle the retainers 24 are slipped into these pockets into the operative position shown in Fig. 1, in which position they are held by cotter pins 26, or their equivalent, passing through suitable apertures formed in the walls of the retainer pockets 25. It will be obvious that the retainers hold the wheel against longitudinal displacement from the axle and that when it is necessary to remove the wheel for any purpose it may be readily accomplished by simply removing the cotter pins 26 and withdrawing the retainers laterally from their pockets, thus freeing the wheel so that it can be slipped off the end of the axle.

As has been previously explained, the inner end of the bearing rollers 18 are retained in proper position by the rib or flange 17. Their outer ends are similarly retained by a ring or holder 27, preferably made of sheet metal of suitable weight, which is slipped onto the end of the axle. Near its end the axle is provided with a circumferential V-shaped groove 28 and when the ring or holder has been slipped onto the end of the axle so that its flange overlies the ends of the bearing rollers, holding lips 29 are punched inwardly from the body of the ring into the groove 28, where they serve to lock the ring to the axle. It will thus be seen that the bearing rollers are mounted upon and secured to the axle and when the wheel is removed the rollers are retained in position on the axle where they are readily accessible for purposes of repair or replacement. A metal bearing sleeve 31 of usual construction is fitted within the cast metal hub of the wheel to afford a bearing and wearing surface for the rollers 18.

Since the structure of the wheel itself and the manner of mounting the rollers is substantially the same in all of the embodiments of my invention disclosed herein, I have not deemed it necessary to show the interior of the hub construction on the drawings except in Fig. 1. In Fig. 4 I have shown a modification of the wheel locking structure which possesses certain advantages over that shown in Fig. 1 in that the sides of the retainer pockets are closed, thus excluding the entrance of dirt, grit and dust into the bearing. In this figure the retainer pockets 32 have closed side walls 33 except for a small opening therethrough. The retainers 35 are channel-shaped, the same as those previously described, but instead of being inserted into operative position through open side walls of the pockets they are introduced into the pockets from the inside before the wheel is slipped onto the axle. The pockets are of sufficient depth to permit the retainers to be slipped outwardly therein sufficiently to clear the flanges 16 and 22. Each retainer is provided with a lateral shank 36 which projects through the openings 34 in the side walls of the pockets 32. After the wheel has been assembled on the axle these retainers are pushed inwardly by pressure exerted from the outside upon the shanks 34 until they are disposed in operative position, whereupon they are held in this position by cotter pins or bolts 37 passed through alined apertures in the shank 36 and the side walls of the opening 34. It should be understood that the shanks 34 do not fit sufficiently snugly in their guide openings to cause breakage of the shanks as the result of lateral movements of the retainers themselves under the stresses and strains imposed upon them by the wheel in its attempted endwise movements.

In Fig. 5 a further modification of the invention is disclosed in that the retainers 24, which are substantially the same as those disclosed in Fig. 1, are slipped into the pockets from the bottom thereof instead of from the side. This structure will be clearly evident from Figs. 5 and 6, from which it will be observed that the retainer pockets are closed at their top and at their sides but are left open at the bottom to permit the longitudinal insertion of the retainers 24. After the retainer has been placed in position, this bottom is closed by a plate 38 which is secured to the walls of the pocket by lag bolts 39 or other means. It will be evident that in this construction the retainer pockets are entirely closed so as to exclude the entrance of any dirt or dust into the bearing box. It should also be noted in connection with each of the forms of the invention herein shown that sufficient clearance is left between the retainer and the end walls of the pockets so that the retainer never comes in contact with these end walls to transmit any of the end thrusts or pulls of the wheel to the bearing box itself, but all these thrusts and pulls are transmitted through the shoulder 16 directly to the axle so that these strains are distributed between the two bearing boxes instead of coming entirely upon one box, as occurs where the wheels are locked directly to the boxes.

It is believed that my invention and many of its inherent advantages will be readily appreciated from the foregoing without further description, and it should be obvious that the invention is capable of considerable modification and variation in its structural embodiment without departing from the essence of the invention as set forth in the following claims.

I claim:

1. In a mine car wheel, the combination of a bearing box, an axle journaled in said box and provided with a radial flange disposed within the box, a wheel having a hub journaled on said axle, and means engaging said hub and said flange to lock the wheel to the axle against longitudinal displacement.

2. In a mine car wheel, the combination of a bearing box, an axle journaled therein and provided with a radially disposed shoulder, a wheel mounted on said axle provided at the inner end of its hub with a radially disposed shoulder, and means structurally independent of said box for locking said shoulders together to prevent longitudinal displacement of the wheel from the axle.

3. In a mine car wheel, the combination of a one-piece bearing box, an axle journaled therein, a wheel mounted on said axle, radially projecting shoulders on said axle and wheel in proximity to each other, and a retaining member adapted to embrace said shoulders on the wheel and axle respectively to retain said wheel on the axle, said member being removable from operative position to permit removal of the wheel longitudinally from said box.

4. In a mine car wheel, the combination of a bearing box, an axle journaled therein and provided with a radial flange, a wheel mounted on said axle, the inner end of the wheel hub being adapted to bear against said axle flange and being provided with a circumferential shoulder, and a retaining member disposed within said box and embracing said hub and axle shoulders to prevent displacement of the wheel on the axle.

5. In a mine car wheel, the combination of a bearing box, an axle journaled therein and provided with a circumferential shoulder, a wheel mounted on said axle and provided with a circumferential shoulder adjacent to said axle shoulder, a retaining member movable in said box into position to embrace said axle and wheel shoulders so as to hold the wheel against longitudinal displacement from the axle, and means for holding said retaining member in place.

6. In a mine car wheel, the combination of a bearing box, an axle journaled therein, said axle being provided near its end with a circumferential groove, a collar fixed on said axle and provided with a circumferential shoulder disposed within said box, a wheel mounted on said axle and having at its inner end a circumferential shoulder, a channel-shaped retainer embracing said wheel and axle shoulders to hold said wheel against longitudinal displacement, bearing rollers interposed between said axle and said wheel hub, a roller retaining rib formed on the outer face of said collar flange, and a roller retaining member seated in said axle groove, whereby said bearing rollers are retained on the axle upon removal of the wheel.

7. In a mine car wheel, the combination of a bearing box, an axle journaled therein, a wheel provided with a bearing sleeve mounted on said axle, bearing rollers interposed between the hub of said wheel and said axle, and means for retaining said rollers in position on the axle when the wheel and sleeve are removed.

8. In a mine car wheel, the combination of a bearing box, an axle journaled therein, bearing rollers, means for retaining said rollers in position around the axle, a wheel having a hub adapted to receive said axle and rollers thereon, and means within said box and removable therefrom for locking said wheel to the axle against longitudinal displacement therefrom.

9. In a mine car wheel, the combination of a bearing box, an axle journaled therein, a wheel mounted on said axle, a collar mounted on said axle at the inner end of said wheel adapted to receive the inwardly directed end thrust of the wheel, and a removable retainer disposed within said box in position to embrace said collar and a portion of said wheel, whereby said wheel is retained against longitudinal displacement from the axle.

10. The combination of a wheel hub, a housing fixed within said hub, an axle, bearing rollers interposed between said axle and said housing, and means mounted on the axle providing a raceway for the rollers at each end thereof by which said rollers are retained in position on the axle upon removal of the wheel and housing.

11. The combination of an axle, bearing rollers surrounding said axle, radial flanges carried by the axle and provided with bearing raceways for the ends of said rollers by which said rollers are retained in position on the axle, and a wheel removably mounted on said bearing rollers.

12. The combination of an axle, a wheel, bearing rollers surrounding said axle, and means carried by the axle and engaging the ends of said rollers for retaining said rollers in position on the axle and exposed for inspection upon removal of said wheel.

13. The combination of an axle provided with a radial flange remote from its end, said flange having an annular shoulder providing a bearing roller raceway, a retainer secured to said axle near its outer end and providing a bearing roller raceway, bearing rollers engaged in said raceways, the ends thereof being surrounded and retained on the axle by said raceways, and a wheel removably journaled upon said rollers.

14. The combination of an axle provided near its outer end with a circumferential groove, a retainer engaged in said groove and carried by the axle, a radial flange spaced from said retainer and provided with an annular shoulder forming a retainer, roller bearings surrounding the axle and held in position thereon by said retainers, and a wheel journaled upon said bearing rollers.

15. The combination of an axle provided with a radial flange, a wheel journaled on said axle and provided at the inner end of its hub with a radial flange disposed in proximity to said axle flange, a bearing box and means movable relatively to said box and embracing said axle and wheel flanges for locking said wheel to the axle against longitudinal displacement.

16. The combination of a bearing box, an axle journaled therein, a radially disposed flange positioned within said box, a hub journaled on said axle in telescopic relation to the box and provided at its inner end with a radial flange, and channel-shaped means disposed within the box but removable therefrom for overlapping and detachably locking said flanges together against longitudinal displacement.

17. The combination of a bearing box, an axle projecting therethrough, a flange projecting radially outwardly within said box, a wheel provided with a hub projecting into said box and having a radially disposed flange at its inner end, and a channel-shaped locking member embracing said flanges to detachably lock said wheel against longitudinal displacement.

18. In a mine car wheel, the combination of a bearing box, an axle, a sleeve interposed between the bearing portion of said box and said axle, the outer end of said sleeve being provided with a roller bearing raceway, bearing rollers surrounding said axle and having their inner ends engaged in said raceway, a raceway for the outer ends of said rollers, and a wheel mounted upon said bearing.

L. G. BINKLEY.